(12) United States Patent
Canteleux et al.

(10) Patent No.: US 6,474,737 B1
(45) Date of Patent: Nov. 5, 2002

(54) VARIABLE CONFIGURATION AUTOMOBILE VEHICLE SEAT

(75) Inventors: Joël Canteleux, Gallardon (FR); Olivier Naudet, Bondoufle (FR)

(73) Assignee: Bertrand Faure Equipments SA, Boulogne (FR)

( * ) Notice: Subject to any disclaimer, the term of this patent is extended or adjusted under 35 U.S.C. 154(b) by 3 days.

(21) Appl. No.: 09/627,941

(22) Filed: Jul. 28, 2000

(30) Foreign Application Priority Data

Jul. 30, 1999 (FR) .............................. 99 09960

(51) Int. Cl.[7] .............................. B60N 2/10; A47C 1/02
(52) U.S. Cl. .................. 297/321; 297/332; 297/325; 297/378.12
(58) Field of Search .................. 297/53, 54, 378.1, 297/378.12, 378.14, 463.1, 321, 322, 325

(56) References Cited

U.S. PATENT DOCUMENTS

| | | | |
|---|---|---|---|
| 2,746,520 A | * | 5/1956 | Ducrot |
| 3,059,968 A | * | 10/1962 | Schliephacke |
| 4,131,316 A | | 12/1978 | Pallant et al. |
| 4,226,473 A | * | 10/1980 | Johnson |
| 4,368,916 A | * | 1/1983 | Blasin |
| 5,308,145 A | | 5/1994 | Koepke et al. |
| 5,868,467 A | | 2/1999 | Moll |

FOREIGN PATENT DOCUMENTS

FR     2 556 294     6/1985

* cited by examiner

*Primary Examiner*—Michael Safavi
(74) *Attorney, Agent, or Firm*—Marshall, Gerstein & Borun (57) ABSTRACT

A seat comprises a base assembly adapted to be fixed to the body of the vehicle, an articulated support assembly comprising front and rear support links for a seat cushion of the seat each of which has two ends articulated about axes which are respectively fixed relative to the seat cushion and to the base assembly, devices for adjusting the angular position of the support links relative to the seat cushion, and devices for controlling the position of a seat back of the seat relative to the seat cushion. The control devices comprise a convex or concave articulated quadrilateral, which has four corners, a first corner is connected to the seat cushion and the second and fourth corners are connected to the seat back.

11 Claims, 13 Drawing Sheets

VARIABLE CONFIGURATION AUTOMOBILE VEHICLE SEAT

FIELD OF THE INVENTION

The present invention relates to a variable configuration automobile vehicle seat.

BACKGROUND OF THE INVENTION

There is already known in the art, in particular from FR-A-2 556 294, a variable configuration automobile vehicle seat of the type comprising:
- a base assembly adapted to be fixed to the body of the vehicle,
- an articulated support assembly comprising front and rear support links for a seat cushion of the seat each of which has two ends articulated about axes respectively fixed relative to the seat cushion and to the base assembly,
- means for adjusting the angular position of the support links relative to the seat cushion, and
- means for controlling the position of a seat back of the seat relative to the seat cushion.

A seat of the above type enables the seat cushion and the seat back to be moved simultaneously to change the seat from a normal configuration to a relaxation configuration in which, compared to the normal configuration, the top of the seat back is inclined rearwardly and the front of the seat cushion is moved and raised forwardly.

The articulated support system of the seat described in FR-A-2 556 294 is operated by two actuators and is relatively complex. Moreover, because they can operate on either actuator, there is a risk that occupants of the seat may unintentionally move the seat into a hazardous configuration such that the position of the seat cushion relative to the seat back encourages "submarining" of the occupant. Submarining causes the occupant of the seat to slip under the abdominal strap of the seat belt usually associated with the seat.

OBJECTS AND SUMMARY OF THE INVENTION

The object of the invention is to propose a seat of the aforementioned type, which is easy to manoeuvre, reliable and strong and very safe.

To this end, the invention provides a variable configuration automobile vehicle seat of the aforementioned type which is characterised in that the control means comprise an articulated quadrilateral which has four corners, a first corner is connected to the seat cushion and the second and fourth corners are connected to the seat back.

According to other features of the seat:
- the first corner of the control quadrilateral coincides with the articulation axis of the rear support link, which is fixed relative to the seat cushion,
- the articulated control quadrilateral is convex, the second corner is connected to the seat cushion and to the base assembly, and the articulated quadrilateral is materialised by the support link which defines the first and second corners of the quadrilateral and by a control link which defines the third and fourth corners of the quadrilateral and which has two ends articulated about axes respectively fixed relative to the seat cushion and to the seat back,
- it has releasable means for locking the seat back to the fourth corner of the articulated quadrilateral so that after the locking means are released the seat back can pivot about the second corner of the quadrilateral between an upright normal position of use and a position folded against the seat cushion,
- the locking means comprise a pin materialising the fourth corner of the articulated quadrilateral and a hook articulated to the seat back and adapted to cooperate with the pin and the second and fourth corners are connected together by a connecting link,
- the articulated control quadrilateral is concave, the second corner is connected to the seat cushion and to the seat back and coincides with an articulation axis of the seat back which is fixed relative the seat cushion, the articulated quadrilateral is materialised by the seat cushion extending between the first and second corners of the quadrilateral and by a control link which defines the third and fourth corners of the quadrilateral and which has two ends articulated about axes fixed relative to the seat back and to the rear support link, and the axis about which the control link is articulated to the rear support link is placed on the rear support link between the axes about which the rear support link is articulated to the seat cushion and to the base assembly,
- the means for adjusting the angular position of the support links relative to the seat cushion comprise an actuator having two ends articulated about axes respectively fixed relative to the seat cushion and to one of the support links,
- the actuator is of a mechanical type, for example of the screw and nut type,
- the ends of the actuator are articulated to the front of the seat cushion and to the front support link and the axis about which the actuator is articulated to the front support link is placed on the front support link between the axes about which it is articulated to the seat cushion and to the base assembly,
- the ends of the actuator are articulated to the rear of the seat cushion and to the rear support link and the axis about which the actuator is articulated to the rear support link is placed on the rear support link between the axes about which it is articulated to the seat cushion and to the base assembly, and
- the base assembly comprises a front rail connected to the front support link and a rear rail connected to the rear support link.

BRIEF DESCRIPTION OF THE DRAWINGS

The invention will be better understood after reading the following description, which is given by way of example only and with reference to the accompanying drawings, in which.

MORE DETAILED DESCRIPTION

Figure 1:
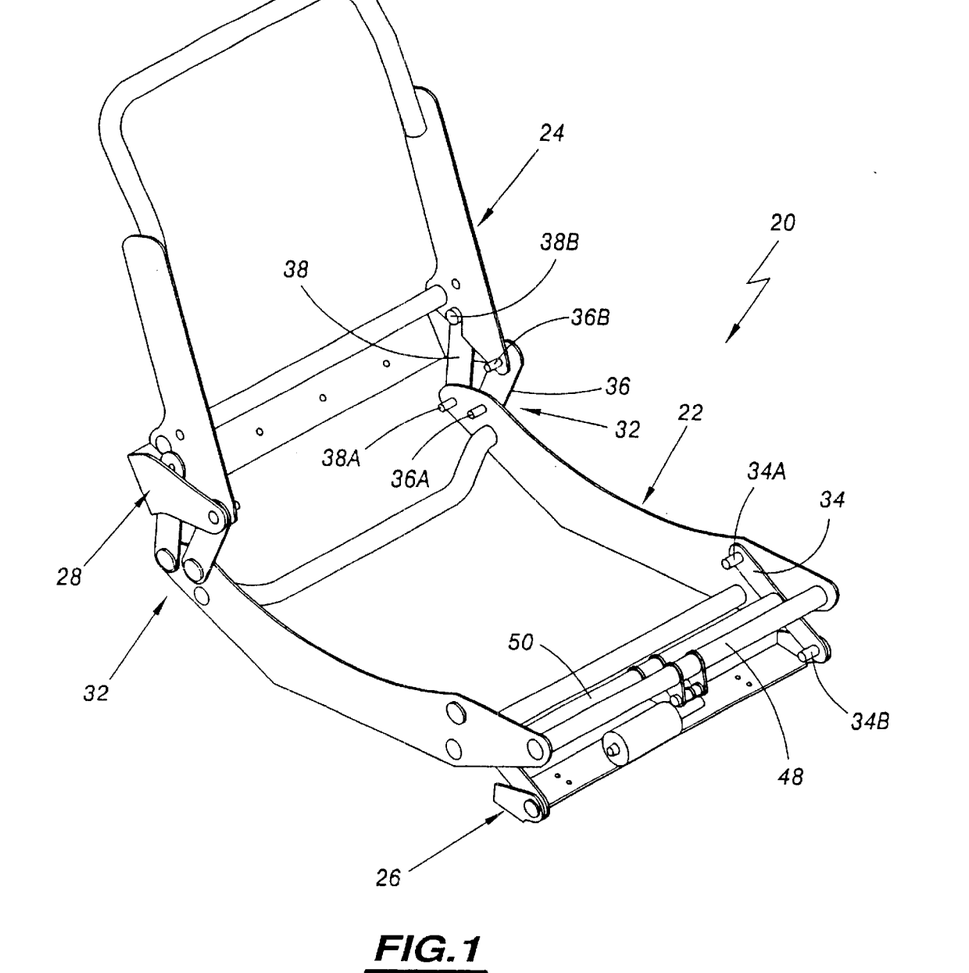
FIG. 1 is a three-quarter front perspective view of a first embodiment of a seat according to the invention, shown in a normal configuration.

FIG. 1 shows a first embodiment of a variable configuration automobile vehicle seat 20 according to the invention.

The seat 20 is preferably a rear seat located behind the driver's seat or a front passenger seat located beside the driver's seat.

The seat 20 comprises a seat cushion 22 and a seat back 24 of which only the respective frames are shown.

In what follows, the terms front, rear, top and bottom refer to the usual orientation of an occupant of the seat 20.

The seat 20 also comprises a base assembly including front and rear rails 26 and 28 adapted to be fixed to a body 30 of the vehicle (see FIGS. 3 to 7). The seat 20 is connected to the base rails 26, 28 by articulated lateral support assemblies, which are substantially symmetrical about a median longitudinal vertical plane of the seat.

For this reason, only one of the articulated support assemblies 32 is described hereinafter.

The articulated support assembly 32 is defined by articulation axes substantially transverse to the seat and parallel to each other in pairs. The support assembly 32 comprises front and rear support links 34 and 36 for the seat cushion 22.

Each support link 34, 36 has two ends articulated about axes 34A, 34B, 36A, 36B which are respectively fixed relative to the front and the rear of the seat cushion 22 and to the front and rear base rails 26 and 28.

The relative positions of the seat cushion 22 and the seat back 24 are controlled by means including an articulated quadrilateral defined by its four corners S1 to S4.

In the first embodiment of the invention, the control quadrilateral is convex, meaning that all the points of the quadrilateral are on the same side of a straight line joining any two consecutive corners (two consecutive corners form the ends of a common side of the quadrilateral).

The convex articulated quadrilateral is materialised by the rear support link 36 which defines first and second corners S1 and S2 of the quadrilateral and by a control link 38, which defines third and fourth corners S3 and S4 of the quadrilateral.

The control link 38 has ends articulated about axes 38A, 38B respectively fixed relative to the rear of the cushion 22 and to the seat back 24.

The corners S1 and S2 respectively coincide with the articulation axes of the rear support link 36 and are therefore respectively fixed relative to the rear of the seat cushion 22 and to the rear base rail 28.

The corners S3 and S4 respectively coincide with the articulation axes of the control link 38 and are therefore respectively fixed relative to the seat cushion 22 and to the seat back 24.

Note that the second corner S2 also coincides with an axis about which the seat back 24 is articulated to the rear base rail 28, with the result that the seat back 24 is articulated at S2 both to the rear support link 36 and to the rear base rail 28.

The angular position of the support links 34, 36 relative to the seat cushion 22 about the axes 34A and 36A is adjusted by means which preferably comprise an actuator 40 which has two ends articulated about axes 40A, 40B respectively fixed relative to the front of the seat cushion 22 and to the front support link 34.

The actuator 40 is preferably of a mechanical type, for example of the type with a screw 42 and a nut 44.

The actuator 40 is common to the two articulated support assemblies 32 and is preferably operated by conventional motor-drive means 46.

The articulation axes 40A, 40B of the actuator are materialised by cross members 48, 50. The cross member 50 materialising the axis 40B about which the actuator is articulated to the front support link 34 connects the two front support links 34 of the two articulated support assemblies 32 (see FIGS. 1 and 2).

Note that the articulation axis 40B is placed on the front support link 34 between the axes 34A, 34B about which that link 34 is articulated to the seat cushion 22 and to the front base rail 26.

Figure 5:
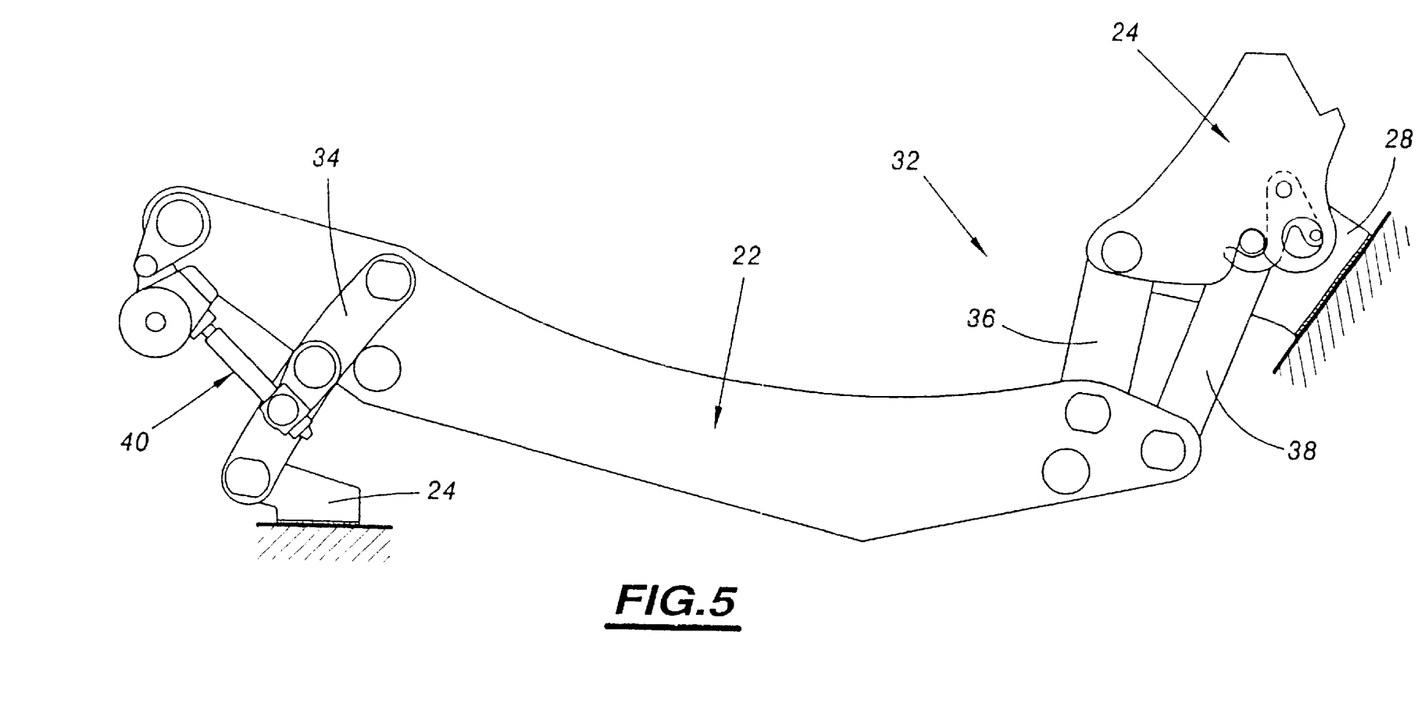
FIGS. 5 and 6 are views similar to FIGS. 3 and 4, showing the seat in a relaxation configuration.
Figure 6:
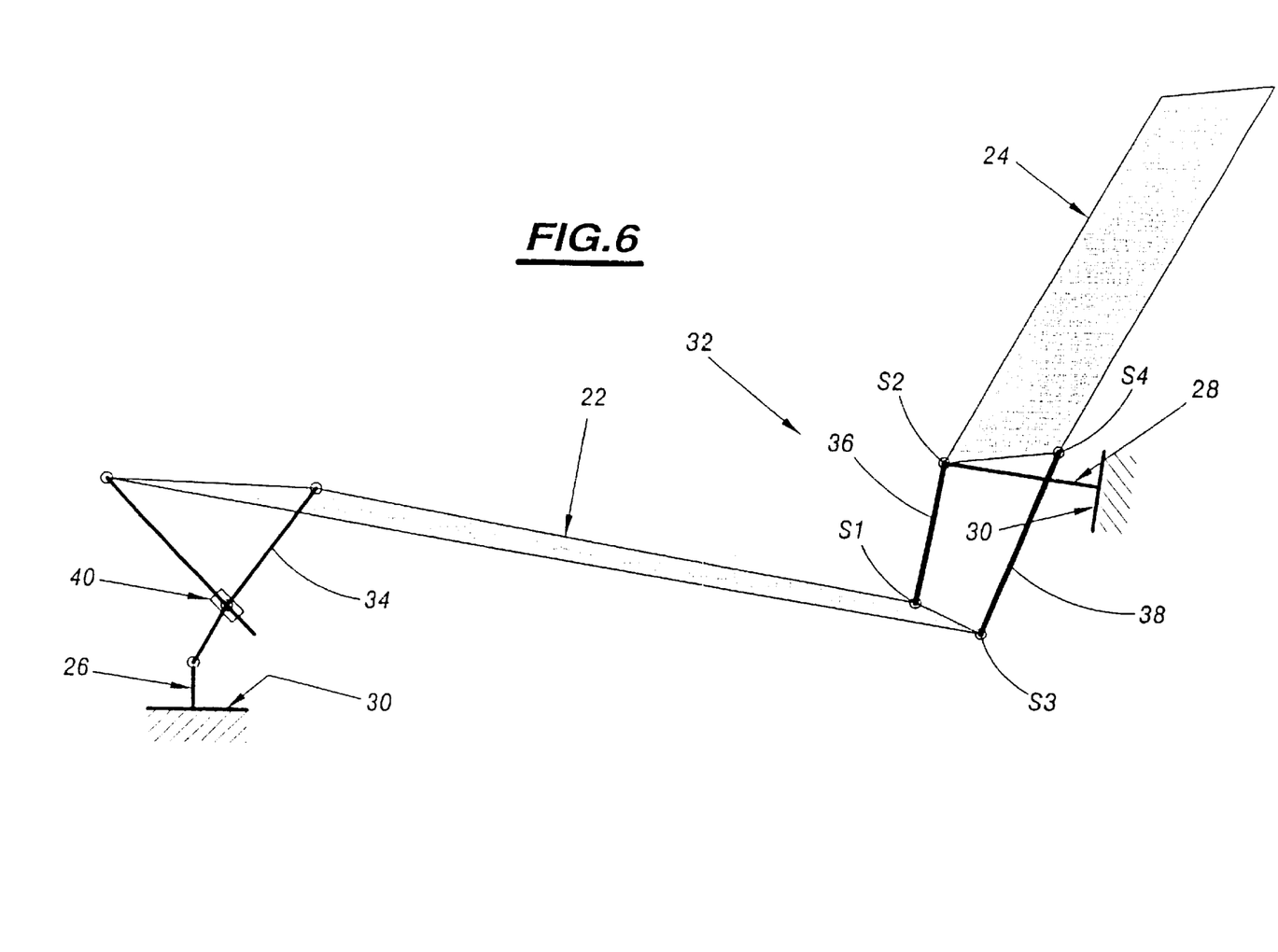

Operation of the actuator 40 changes the seat 20 from the normal configuration shown in FIGS. 1 to 4 to the relaxation configuration shown in FIGS. 5 and 6, in which, compared to the normal configuration, the top of the seat back 24 is inclined rearwardly and the front of the seat cushion 22 is moved and raised forwardly.

The control quadrilateral S1 to S4 causes the seat cushion 22 and the seat back 24 to move concomitantly so as to increase or to reduce the angle between the seat cushion 22 and the seat back 24 and imposes a position of the seat cushion relative to the seat back adapted to prevent submarining of the occupant of the seat 20, regardless of the configuration of the seat.

Submarining causes the occupant of the seat to slide under the abdominal strap of the seat belt usually associated with the seat and can occur in the event of an inappropriate position of the seat cushion relative to the seat back.

The invention efficiently reduces the risk of submarining because the occupant of the seat is unable to adjust the position of the seat cushion independently of that of the seat back and is thereby prevented from unintentionally placing the seat in a hazardous configuration.

In this example, when the configuration of the seat is changed, the seat back 24 moves through twice the angle that the seat cushion 22 moves through.

Moreover, the configuration of the seat can be changed without dangerously modifying the position relative to the seat 20 of anchor points for a seat belt usually associated with the seat if the anchor points are on the body of the vehicle.

Figure 2:
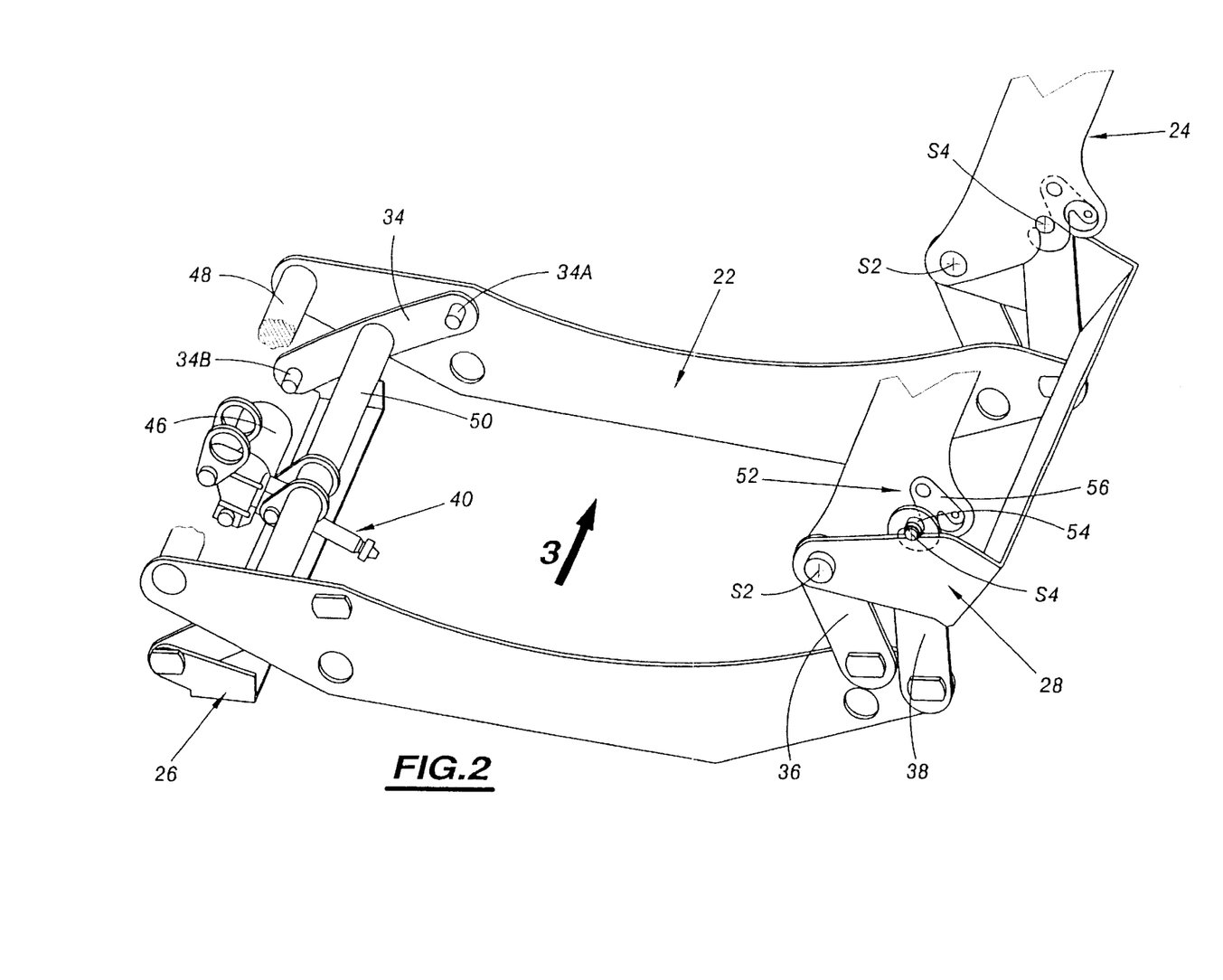
FIG. 2 is a three-quarter-rear perspective view of the seat cushion of the seat shown in FIG. 1.
Figure 3:
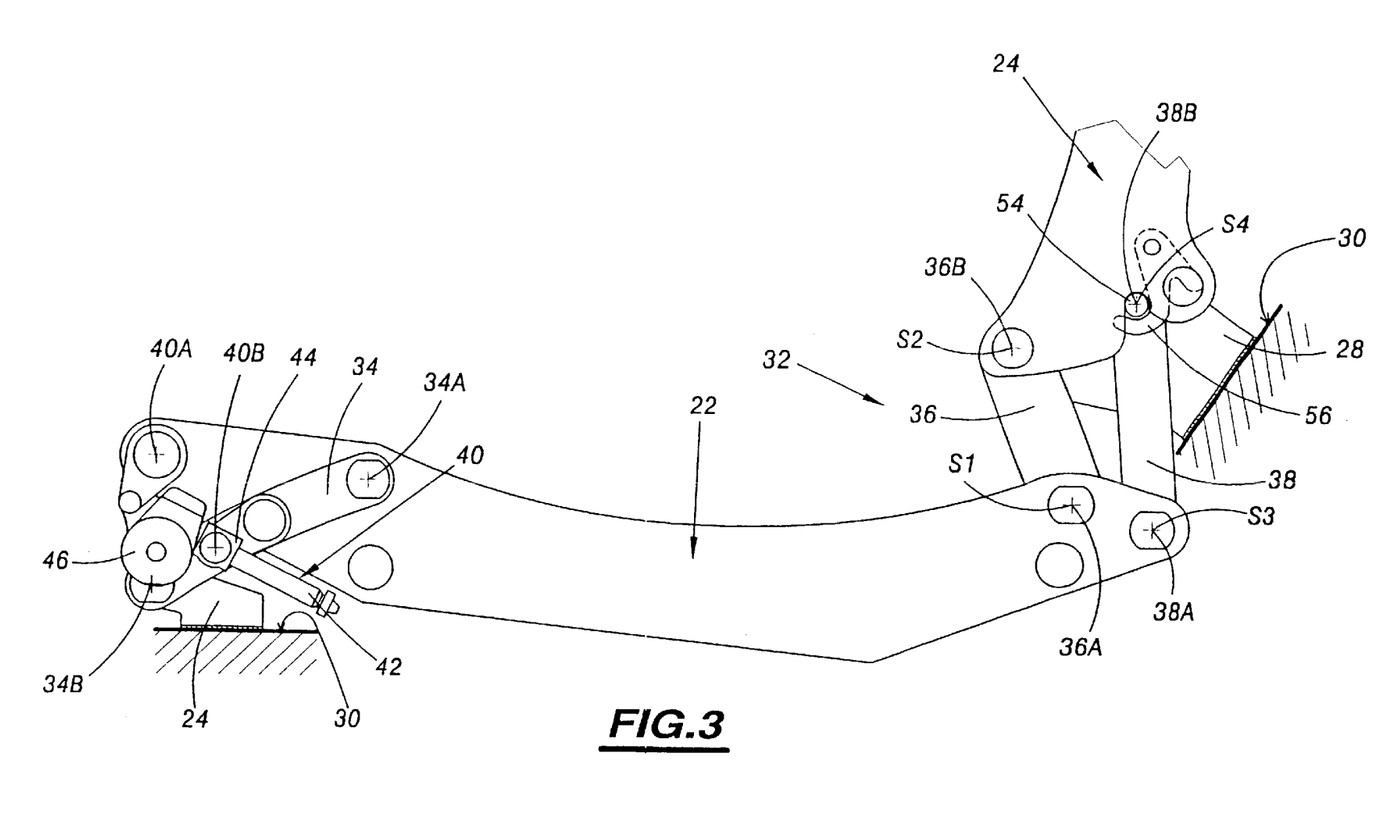
FIG. 3 is a view in the direction of the arrow 3 in FIG. 2.
Figure 4:
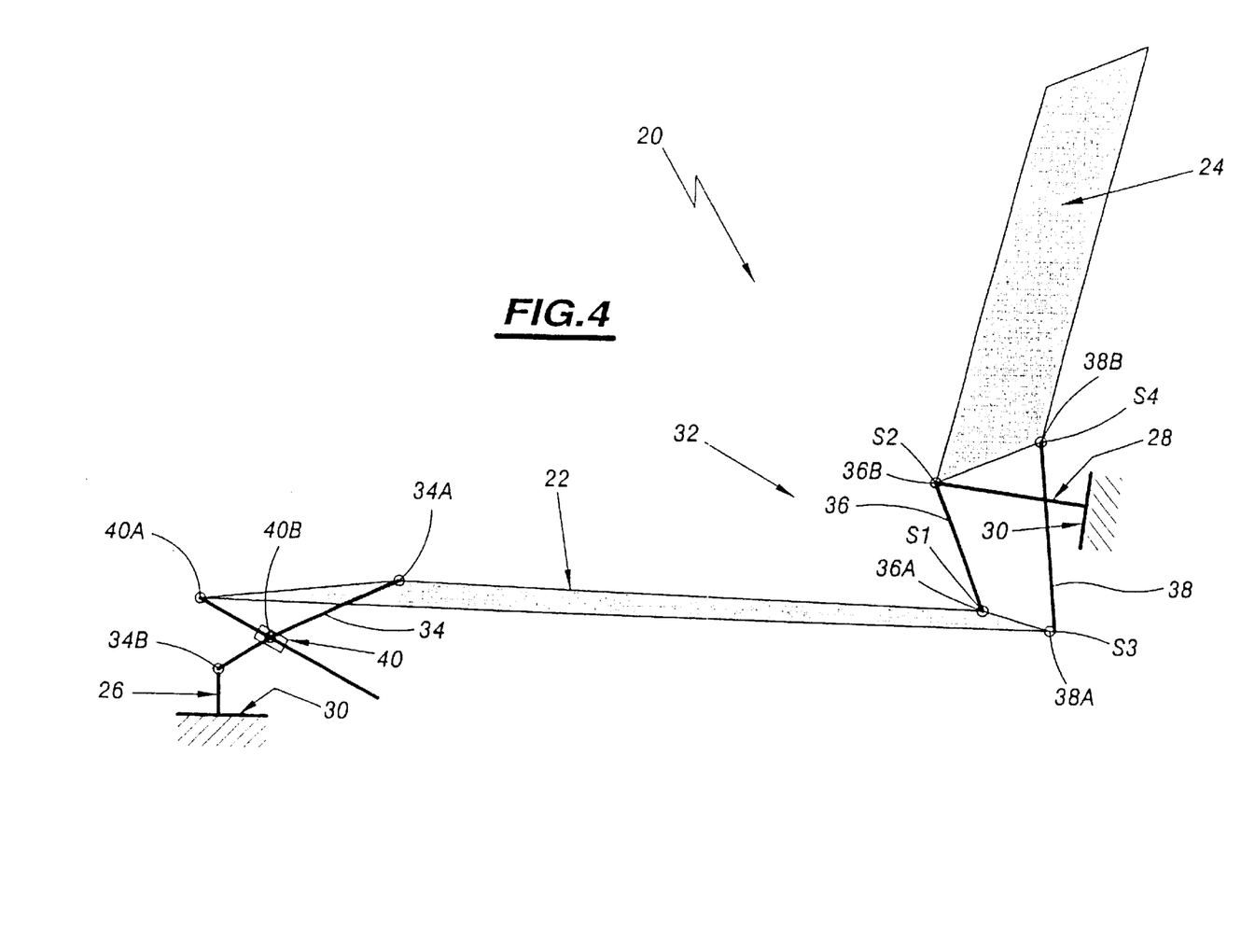
FIG. 4 is a diagrammatic view similar to FIG. 3.
Figure 7:
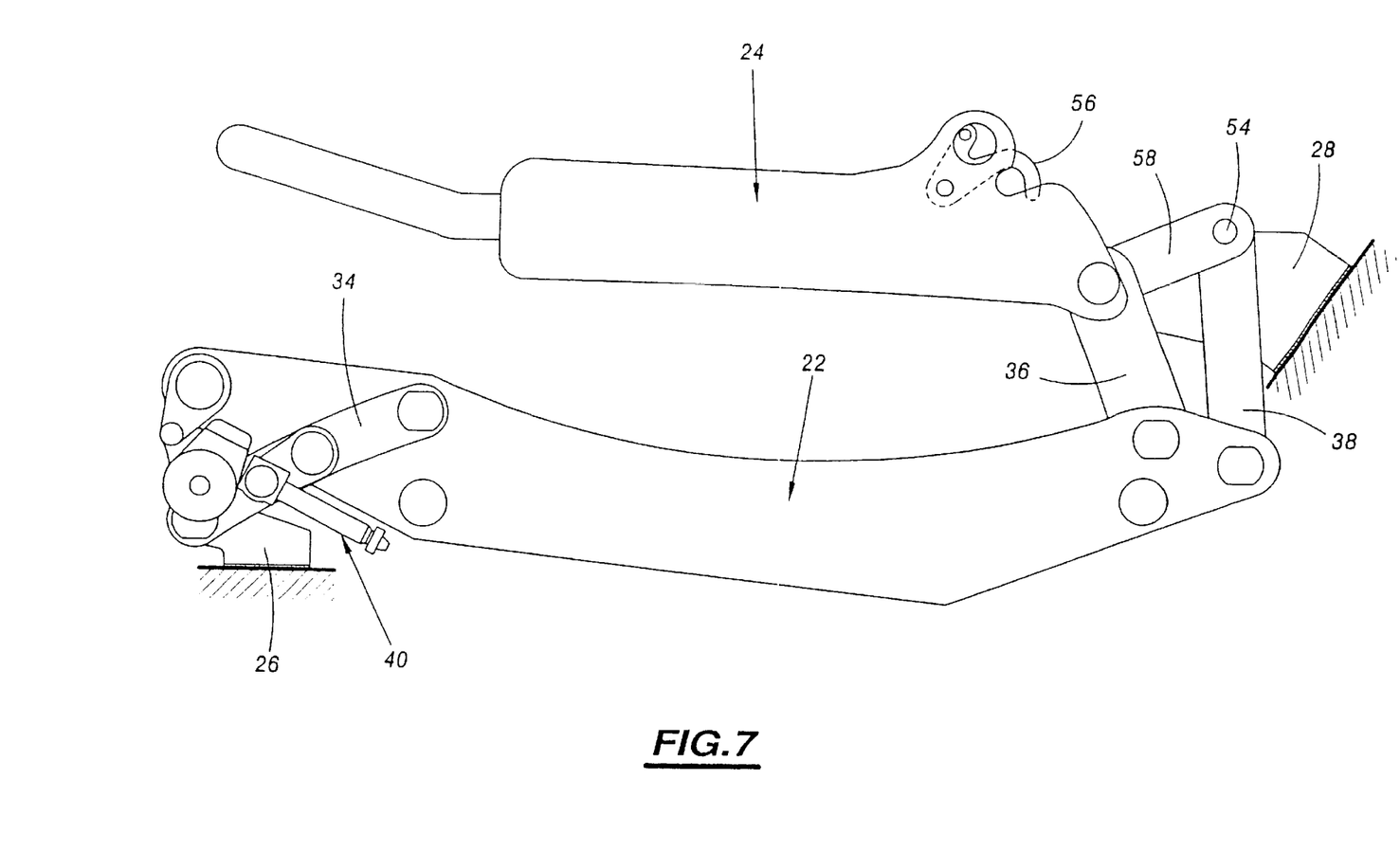
FIG. 7 is a view similar to FIG. 3, showing the seat back folded against the seat cushion.

Referring to FIGS. 2, 3, 5 and 7, it can be seen that the seat 20 is provided with releasable means 52 for locking the seat back 24 to the fourth corner S4 of the quadrilateral so that, after the locking means 52 are released, the seat back 22 can pivot about the second corner S2 of the quadrilateral between a position of normal use shown in FIGS. 1 to 3 and a position folded against the cushion 22 to form a table shown in FIG. 7.

The locking means 52 preferably comprise a pin 54 materialising the fourth corner S4 of the quadrilateral and a hook 56 articulated to the seat back 24 and adapted to cooperate with the pin 54. The hook 56 is operated by conventional means, for example a Bowden cable (not shown), and is designed to be pulled against a return spring, which spring-loads the hook 56 into the position cooperating with the pin 54.

Referring to FIG. 7, it can be seen that the second and fourth corners S2 and S4 of the quadrilateral are connected by a connecting link 58 designed to maintain the structure of the quadrilateral when the locking means 52 are released and the seat back 24 has been folded against the seat cushion 22.

Figure 8:
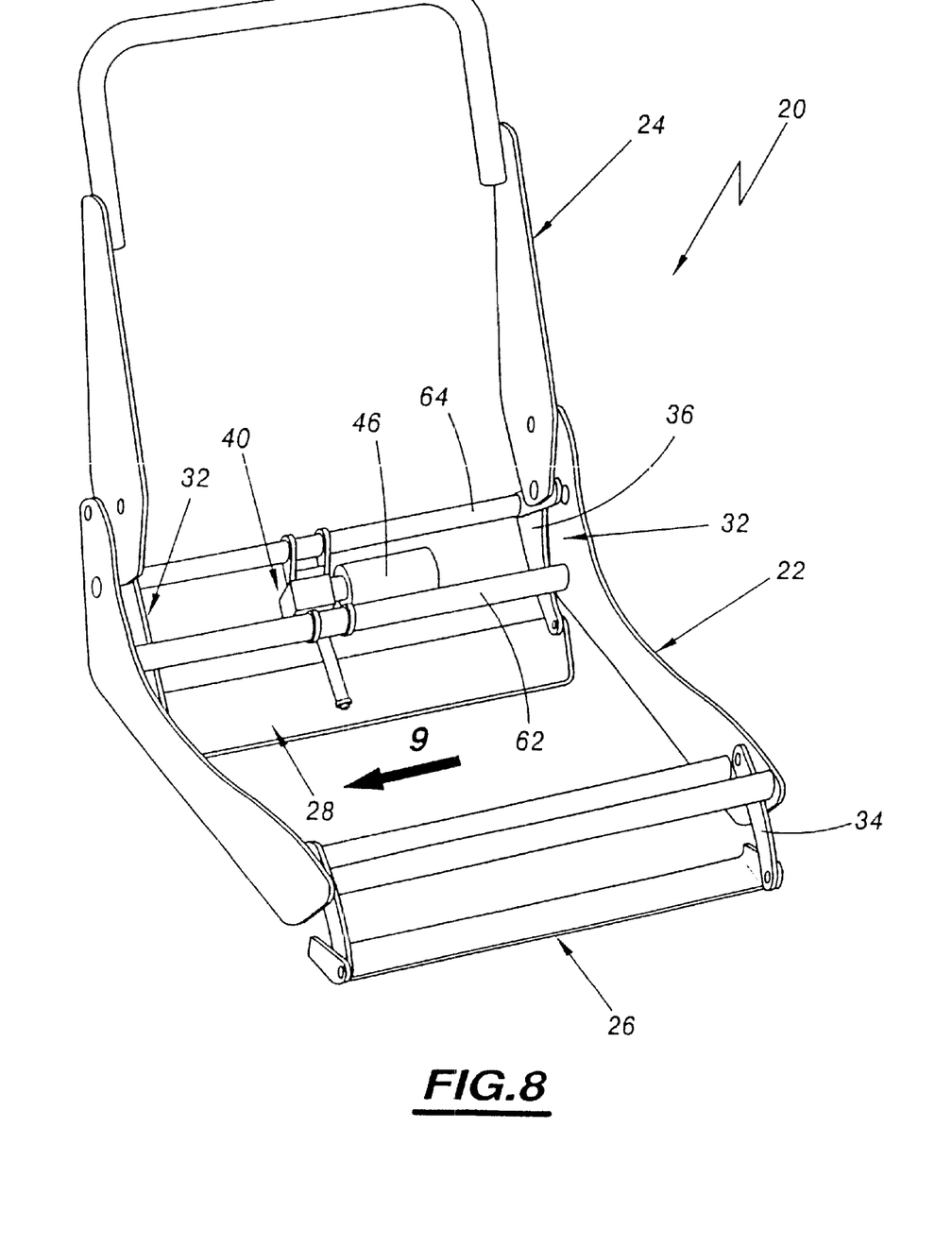
FIGS. 8 to 10 are views similar to FIGS. 1, 3 and 4, respectively, of a second embodiment of a seat according to the invention, shown in a normal configuration.

FIG. 8 and the subsequent figures show a second embodiment of a variable configuration automobile vehicle seat in accordance with the invention. In these figures, components analogous to those shown in FIGS. 1 to 7 are designated by the same reference numbers.

Figure 9:
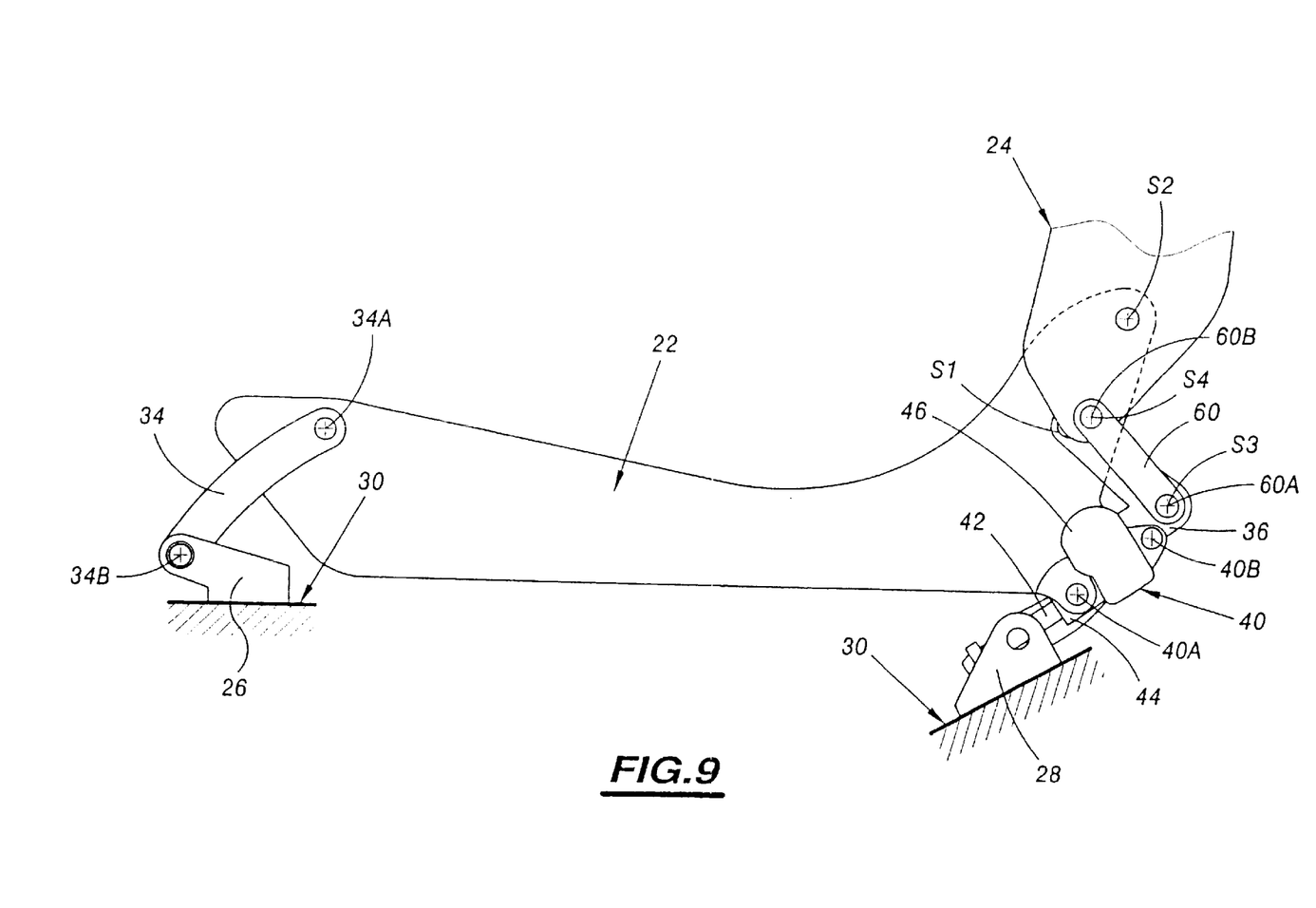
Figure 10:
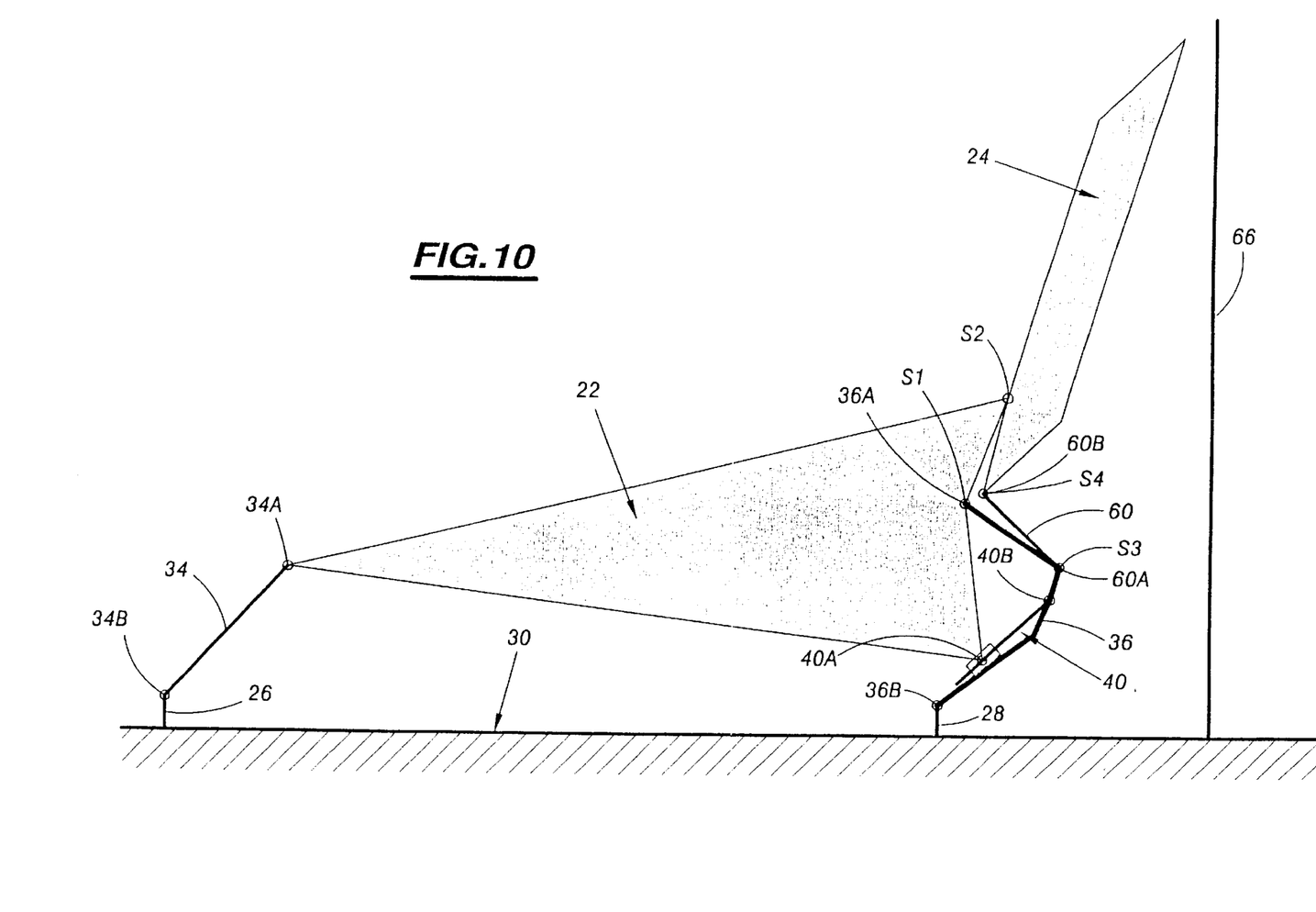
Figure 11:
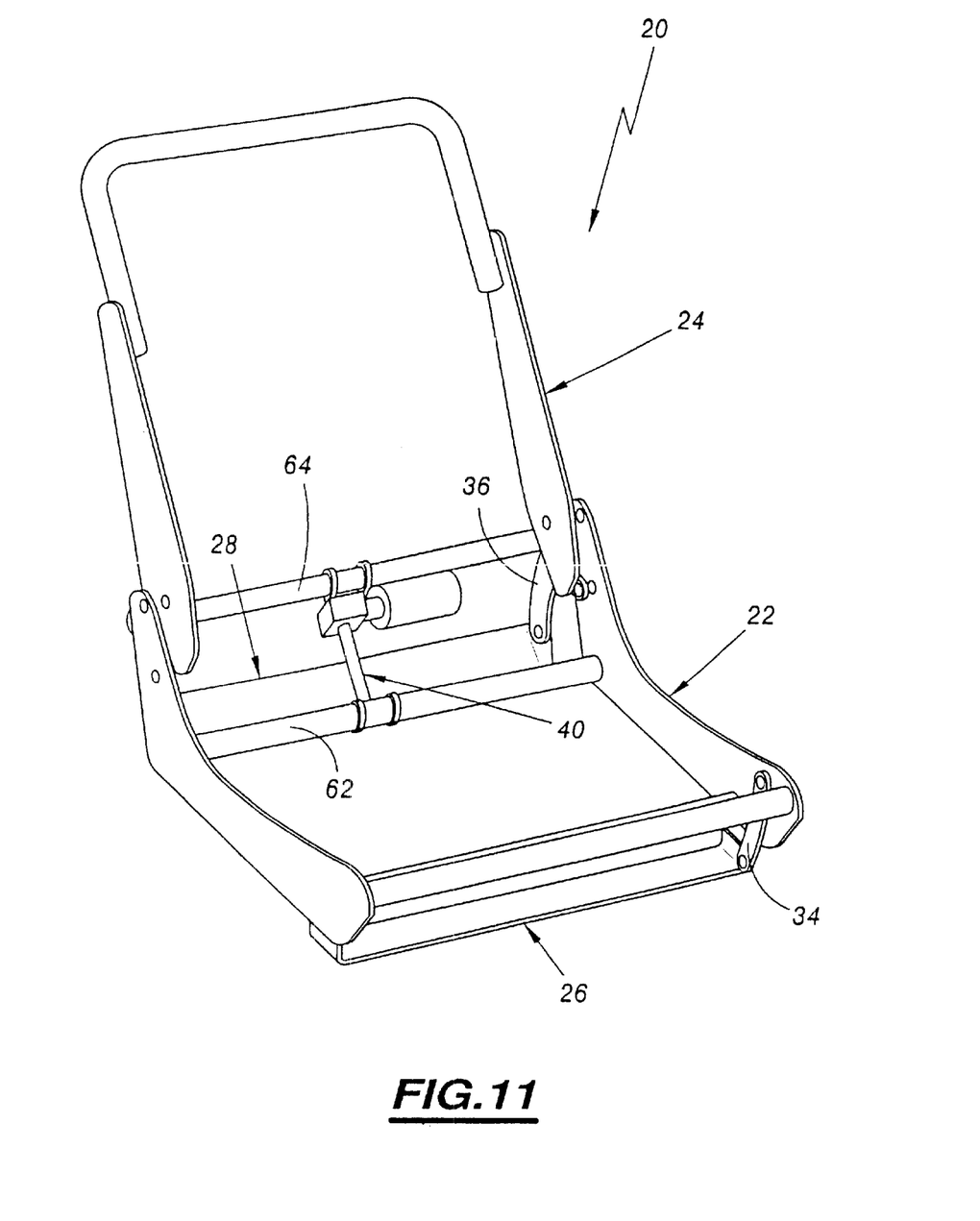
FIGS. 11 to 13 are views similar to FIGS. 8 to 10, showing the seat in a relaxation configuration.
Figure 12:
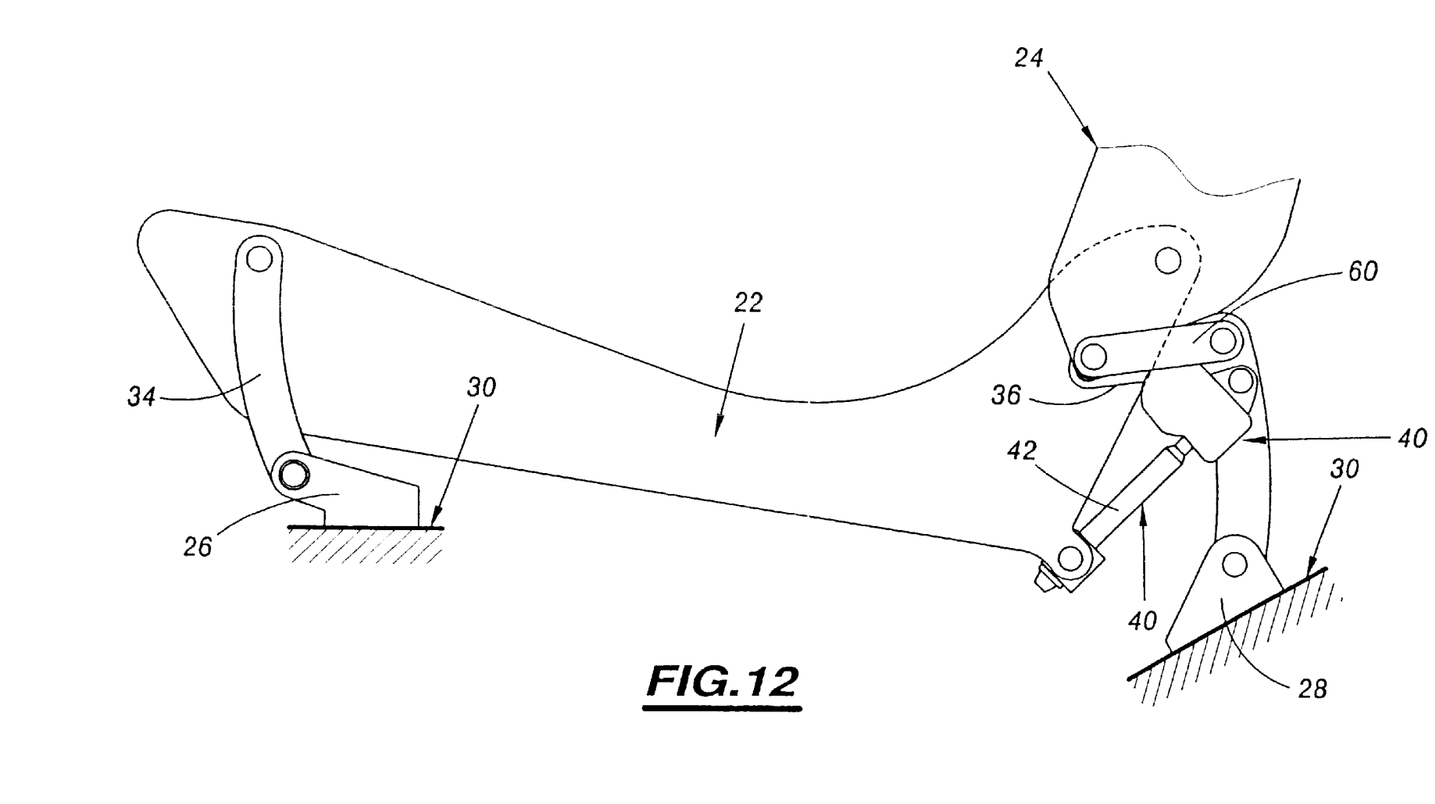
Figure 13:
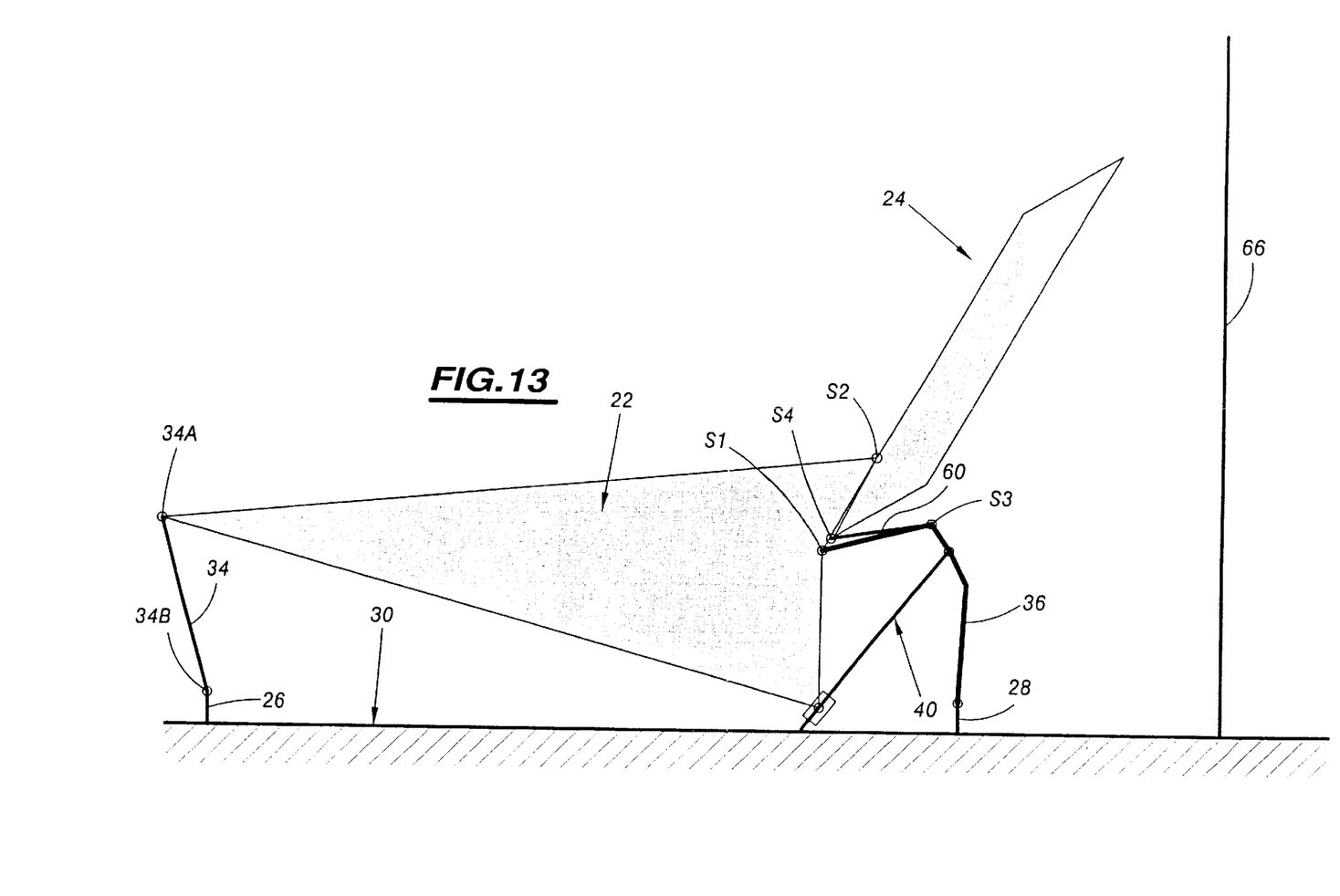

As in the previous embodiment, the seat 20 can be placed in a normal configuration shown in FIGS. 8 to 10 and in a relaxation configuration shown in FIGS. 11 to 13.

In this second embodiment of the invention the quadrilateral S1 to S4 controlling the positions of the seat cushion 22 and the seat back 24 is concave, i.e. not convex.

The rear support link 36 has a generally bent shape to form an arc whose concave sides faces towards the front of the seat. The rear support link 36 has two ends articulated about axes 36A, 36B and respectively connected to the rear of the seat cushion 22 and to the rear base rail 28.

The first corner S1 of the concave quadrilateral coincides with the articulation axis 36A of the rear support link 36, which is fixed relative to the seat cushion. The second corner S2 of the concave quadrilateral coincides with an articulation axis of the seat back 24, which is fixed relative to the seat cushion 22. The second corner S2 is therefore fixed relative to the seat cushion 22 and to the seat back 24.

The concave articulated quadrilateral is therefore materialised by the seat cushion 22 extending between the first and second corners S1 and S2 of the quadrilateral and by a control link 60 defining the third and fourth corners S3 and S4 of the quadrilateral.

The control link 60 has two ends articulated about axes 60A, 60B which are respectively fixed relative to the seat back 24 and to the rear support link 36.

The axis 60A about which the control link 60 is articulated to the rear support link 36 is placed on the rear support link 36 between the axes 36A, 36B about which it is articulated to the seat cushion 22 and to the rear base rail 28.

The ends of the actuator 40 are articulated about axes 40A, 40B which are respectively fixed relative to the rear of the seat cushion 22 and to the rear support link 36.

The articulation axes 40A, 40B of the actuator are materialised by cross members 62, 64 (see FIGS. 8 and 11 in particular) . The cross member 64 materialising the articulation axis 40B of the actuator on the rear support link 36 connects the two rear links 36 of the two articulated support assemblies 32.

Note that the articulation axis 40B is placed on the rear support link 36 between the axes 36A, 36B about which that link 36 is articulated to the seat cushion 22 and to the rear base rail 28, more particularly between the axes 60A and 36B.

The operation of the second embodiment of the seat according to the invention is analogous mutatis mutandis to the operation of the seat according to the first embodiment of the invention.

However, referring to FIGS. 10 and 13, which show a bulkhead 66 behind the seat 20 and separating a passenger compartment from a luggage compartment of a vehicle, it can be seen that when the configuration of the seat 20 is changed, the position of the top of the seat back 24 relative to the bulkhead 66 remains practically unchanged. This is due in particular to the concave control quadrilateral S1 to S4.

We claim:

1. A variable configuration automotive vehicle seat having a seat cushion and a seat back comprising:
    a base assembly adapted to be fixed to the vehicle,
    an articulated support assembly comprising front and rear support links for the seat cushion, each of which has two ends articulated about axes respectively fixed relative to the seat cushion and to the base assembly, said support links having an adjustable angular position,
    means for adjusting the angular position of the support links relative to the seat cushion, and
    means for controlling the position of the seat back relative to the seat cushion, wherein the control means comprise an articulated control quadrilateral, which has first, second, third, and fourth corners, each consecutive corner forming the ends of a common side of an articulated control quadrilateral being separated by a constant distance, wherein the first corner is connected to the seat cushion and the second and fourth corners are connected to the seat back, and wherein said articulated control quadrilateral is adapted for moving the front end of the seat cushion upwardly and forwardly when the seat back is moved from a normal position to a reclining position.

2. A seat according to claim 1, wherein the first corner of the control quadrilateral coincides with the articulation axis of the rear support link which is fixed relative to the seat cushion.

3. The seat according to claim 2, wherein the articulated control quadrilateral is convex, the second corner is connected to the seat back and to the base assembly, and the articulated quadrilateral includes firstly the support link which defines the first and second corners of the quadrilateral and secondly a control link which defines the third and fourth corners of the quadrilateral and which has two ends pivotably mounted about axes respectively fixed relative to the seat cushion and to the seat back.

4. A seat according to claim 3, having releasable means for locking the seat back to the fourth corner of the articulated quadrilateral so that after the locking means are released the seat back can pivot about the second corner of the quadrilateral between an upright normal position of use and a position folded against the seat cushion.

5. A seat according to claim 4, wherein the locking means comprise a pin materialising the fourth corner of the articulated quadrilateral and a hook articulated to the seat back and adapted to cooperate with the pin and in that the second and fourth corners are connected together by a connecting link.

6. A seat according to claim 2, wherein the articulated control quadrilateral is concave, the second corner is connected to the seat cushion and to the seat back and coincides with an articulation axis of the seat back which is fixed relative to the seat cushion, the articulated quadrilateral is includes firstly the seat cushion extending between the first and second corners of the quadrilateral and secondly a control link which defines the third and fourth corners of the quadrilateral and which has two ends articulated about axes fixed relative to the seat back and to the rear support link, and the axis about which the control link is articulated to the rear support link is placed on the rear support link between the axes about which the rear support link is articulated to the seat cushion and to the base assembly.

7. A seat according to claim 1, wherein the means for adjusting the angular position of the support links relative to the seat cushion comprise an actuator having two ends articulated about axes respectively fixed relative to the seat cushion and to one of the support links.

8. A seat according to claim 7, wherein the actuator is an actuator screw and nut.

9. A seat according to claim 3, wherein the means for adjusting the angular position of the support links relative to the seat cushion comprise an actuator having two ends articulated about axes respectively fixed relative to the seat cushion and to one of the support links and wherein the ends of the actuator are articulated to the front of the seat cushion and to the front support link and the axis about which the actuator is articulated to the front support link is placed on the front support link between the axes about which it is articulated to the seat cushion and to the base assembly.

10. A seat according to claim 6, wherein the means for adjusting the angular position of the support links relative to the seat cushion comprise an actuator having two ends articulated about axes respectively fixed relative to the seat cushion and to one of the support links and wherein the ends of the actuator are articulated to the rear of the seat cushion and to the rear support link and the axis about which the actuator is articulated to the rear support link is placed on the rear support link between the axes about which it is articulated to the seat cushion and to the base assembly.

11. A seat according to claim 1, wherein the base assembly comprises a front rail connected to the front support link and a rear rail connected to the rear support link.

* * * * *